United States Patent

[11] 3,603,868

[72] Inventor Richard S. Milton
     Huntsville, Ala.
[21] Appl No 8,566
[22] Filed Feb. 4, 1970
[45] Patented Sept. 7, 1971
[73] Assignee The United States of America as
     represented by the Secretary of the Army

[54] CONTROLLED FIELD ALTERNATOR CHARGING SYSTEM
     6 Claims, 2 Drawing Figs.
[52] U.S. Cl. ................................................ 322/7,
     322/27, 322/28, 322/68, 322/73
[51] Int. Cl. .................................................. H02p 9/30
[50] Field of Search ................................... 322/7, 27,
     28, 37, 68, 73

[56] References Cited
     UNITED STATES PATENTS
     3,518,528  6/1930   Frierdich .................. 322/73 X
     3,173,077  3/1965   Kirk et al. ................ 322/73
     3,353,088  11/1967  Roche ...................... 322/27
     3,369,171  2/1968   Lane ......................... 322/27 X
     3,378,754  4/1968   Rosenberry, Jr. ......... 322/28

Primary Examiner—Oris L. Rader
Assistant Examiner—H. Huberfeld
Attorneys—Harry M. Saragovitz, Edward J. Kelly, Herbert Berl and Harold W. Hilton ABSTRACT: A control system for charging energy storage capacitors and for providing a source of constant current. The power source is a shaft-driven alternator. The alternator field is controlled by current from a current or control transformer. Energy is coupled from the alternator through the above current transformer to a control circuit and to a load bridge rectifier for conversion to direct current-output energy. The energy that is coupled through the transformer secondary is connected through a diode bridge circuit to excite a field coil for controlling the alternator field. Energy is also coupled to an alternating current voltage level sensor that short circuits the current transformer secondary when the output energy is becoming excessive, thereby reducing the alternator field and the output voltage. The load bridge rectifier output is connected to a load capacitance for supplying a fixed DC voltage pulse for additional load circuitry. Load voltage regulation circuitry limits the load capacitor charge level by short circuiting the field coil when the desired voltage level is reached.

PATENTED SEP 7 1971

3,603,868

Richard D. Milton,
INVENTOR.

BY Harry M. Saragovitz
Edward J. Kelly
Herbert Berl
Harold W. Hilton

3,603,868

CONTROLLED FIELD ALTERNATOR CHARGING SYSTEM

BACKGROUND OF THE INVENTION

Capacitor charging devices of the prior art operate from constant voltage sources. When a capacitor is charged from a constant voltage source, only about 50 percent of the energy removed from the power source is stored in the capacitor. The remaining energy is lost, usually as heat in a resistor or in the source itself. To avoid this power loss, the source voltage must be varied in a way other than simply dissipating it in a resistor. Typically, the variation in source voltage is accomplished with a variable ratio transformer. Disadvantages of the prior art capacitor charging systems obviously include low efficiency, bulky heat removal equipment, and a large direct current power source.

SUMMARY OF THE INVENTION

A constant current charging system is provided for charging energy storage capacitors and for a source of constant current. The controlled field alternator charging system is versatile and rugged, requires no battery or high-power transistors and offers relatively high efficiency with a good charge rate capability. The voltage supplied to the load is controlled at the power source. There are no resistors in the power circuit to reduce the efficiency of the system and create further heat dissipation problems. The controlled field alternator charger system can be utilized efficiently when commercial power is impractical and where shaft power is available. Existing alternators on land vehicles or aircraft can provide the power requirements or an extra alternator can be simply fitted to the vehicle. A standard vehicle alternator is the system power source, providing alternating current energy to a control system and to a rectifier circuit. Direct energy output from the rectifier is coupled to a capacitive load or other load equipment. The control system includes transformer coupling of energy from the power system to an alternator magnetic field coil and to a current level sensor for maintaining a constant charging current.

An object of the present invention is to provide a simple, efficient, constant current generator for charging energy storage capacitors.

Another object of the present invention is to provide a shaft-driven direct current power system for providing an efficient constant current output.

A further object of the present invention is to provide a constant direct current power system having voltage control at the alternating current power source.

DESCRIPTION OF THE PREFERRED EMBODIMENT

Figure 1:
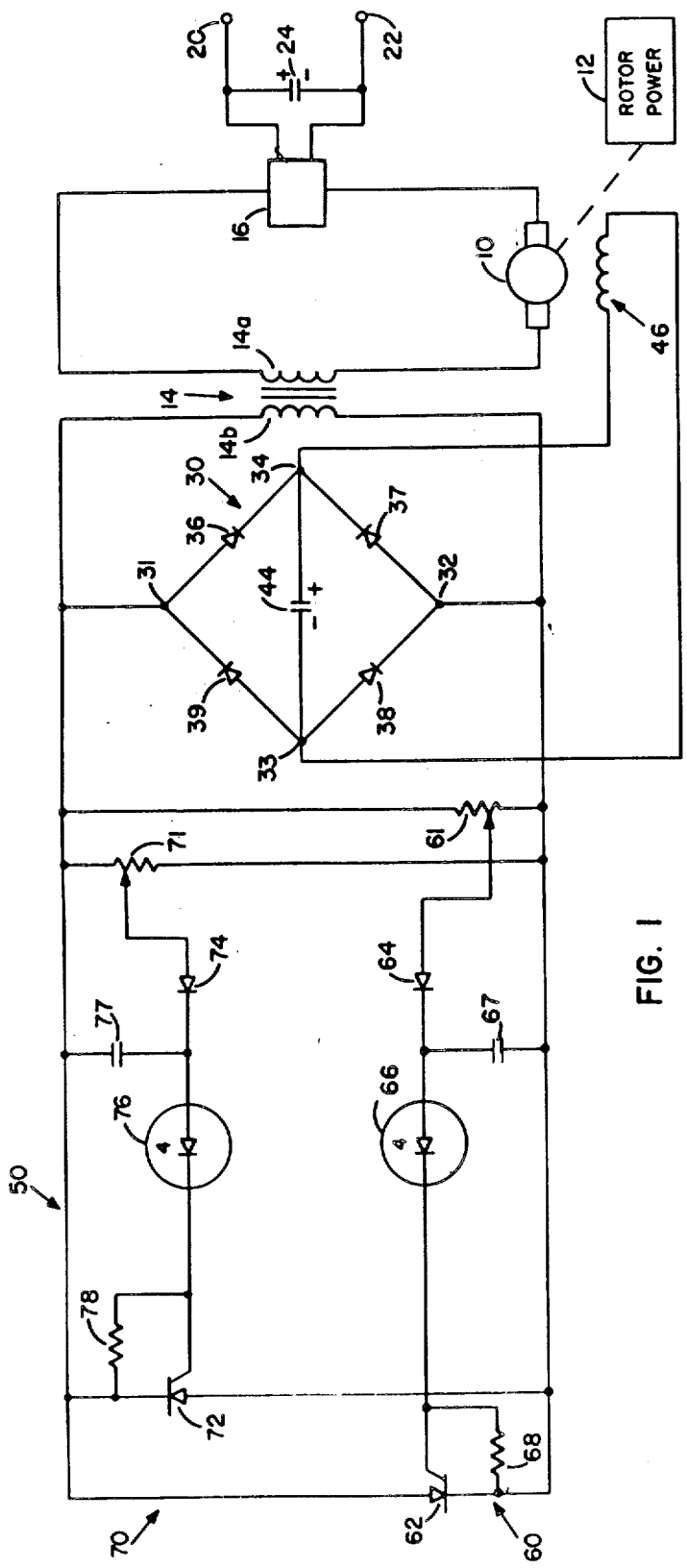
FIG. 1 is a schematic of a preferred embodiment of the controlled field alternator charging system.

Referring now to the drawings, there is shown in FIG. 1 a schematic of a controlled field alternator system. A shaft-driven alternator 10 is mechanically driven by rotary power source 12. One winding of alternator 10 is connected in series with primary winding 14a of a transformer 14. A full-wave bridge rectifier 16 has the input terminals thereof respectively connected to the alternator 10 winding and the other side of transformer 14a to complete the system power loop. Output terminals 20 and 22 of rectifier 16 have a load capacitor 24 connected thereacross with terminal 20 selected as the positive (+) charging side of the rectifier output.

The system control circuit comprises current or control transformer 14, a diode bridge rectifier 30, a field coil 46 and an alternating current (AC) voltage level detector 50. Transformer secondary 14b is connected across opposing input junctions 31 and 32 of diode bridge rectifier 30. Output junctions 33 and 34 are connected across field coil 46 with junction 34 being a positive (+) side of the pulsating direct current (DC) signal thereon. A capacitor 44 is connected between output junctions 33 and 34 to stabilize the field current of coil 46. The AC level detector 50 includes sensors 60 and 70 for control of alternate half cycles of potential energy. In sensor 60, a potentiometer 61 and a silicon-controlled rectifier 62 are connected in parallel across secondary 14b of transformer 14. The variable arm of potentiometer 61 is connected to the anode of a diode 64. A cathode gate of SCR 62 is connected to the cathode of a four-layer diode 66. Diode 66 has the anode thereof connected to the cathode of diode 64 and to one side of a switching capacitor 67. The other side of capacitor 67 and to one side of a switching capacitor 67. The other side of capacitor 67 is connected to the cathode of SCR 62 and one side of potentiometer 61. A bleeder resistor 68 is connected between the cathode of SCR 62 and the cathode of diode 66 to reduce the possibility of false gate triggering of the SCR. Sensor 70 comprises potentiometer 71, diode 74, capacitor 77, four-layer diode 76, SCR 72 and resistor 78 interconnected as in sensor 60. Externally sensor 70 is connected in opposition to sensor 60, thus the cathode of SCR 72 is connected to the anode of SCR 62 and the respective potentiometers are terminated in opposition across transformer secondary 14b.

Figure 2:
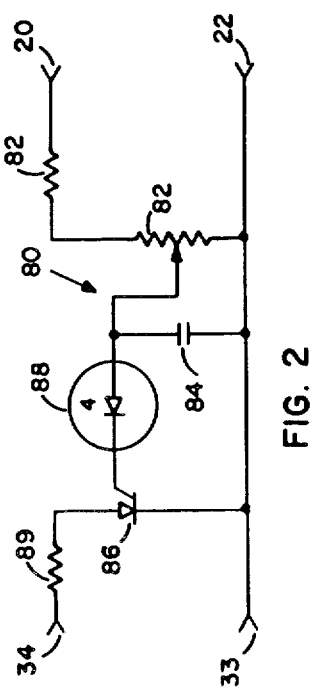
FIG. 2 is a voltage regulator circuit for the system of FIG. 1.

FIG. 2 shows a voltage regulator 80 for controlling the charge voltage level across capacitor 24 of FIG. 1. A resistive voltage divider 82 is connected between output terminals 20 and 22 across capacitor 24. A portion of the voltage developed across divider 82 is coupled through a variable arm of resistance 82 to charge a capacitor 84. A silicon-controlled rectifier 86 has a cathode gate connected to the cathode of a four-layer diode 88. Diode 88 has the anode thereof connected to the junction of capacitor 84 and the variable arm of resistance 82. Opposing junctions 33 and 34 of bridge 30 are connected across SCR 86 with positive junction 34 being connected through a low resistance 89 to the anode of SCR 86. The other side of capacitor 84 is connected to terminal 22 and junction 33, for discharging through SCR 86.

In operation, rotational power is supplied from source 12 to drive alternator 10 which develops an AC current through rectifier 16 and transformer primary 14a. The rectified AC signal is developed across rectifier output terminals 20 and 22 and capacitor 24. The controlled field alternator charging system will continue to charge capacitor 24 with a constant current until a predetermined voltage is reached determined by the alternator parameters, field current and rotor speed. A small percentage of the energy passed through primary 14a is coupled through secondary 14b to control circuitry. Assuming junction 31 of bridge 30 to be receiving a positive half cycle of current, conduction is through diode 36 to junction 34 developing a positive charge across capacitor 44 and field coil 46 with junction 34 being positive. With junction 31 negative junction 32 is positive and conduction is through diode 37 to maintain pulses of positive energy on terminal 34, thus developing the magnetic field of coil 46 in proportion to the potential and frequency of alternator 10. The field resistance of coil 46 is constant and therefore the voltage across diode bridge 30 is proportional to the current in both primary and secondary of transformer 14.

Ideally, sensors 60 and 70 have a balanced input due to the setting of potentiometers 61 and 71. Assuming diode bridge junction 31 to be positive, the anode of SCR 62 is positive. Current flows through potentiometer 61, diode 64 and charges capacitor 67. When the potential across capacitor 67 overcomes the forward breakdown potential of diode 66 the diode conducts into the cathode gate of SCR 62. This triggers SCR 62 into conduction and causes a short circuit of secondary 14b. This short circuit removes field coil 46 current until the next half cycle allows the same process to take place in sensor 70. The removal of field current from coil 46 causes the coil to become a generator instead of a load. The polarity is reversed across coil 46 and the voltage thereacross is immediately discharged through the parallel paths of diodes 38–37 and 39–36, rapidly collapsing the field. Removal of the magnetic field of coil 46 allows the flux density to become zero which results in zero volts being generated by alternator 10 and effectively reduces the load current output.

Capacitors 67 and 77 store the energy that triggers the silicon-controlled rectifiers. These capacitors cannot be discharged through the potentiometers due to diodes 64 and 74. Neither can capacitors 67 and 77 be charged in reverse through the diodes. The load currents applied to rectifier 16 is therefore controlled and limited by the control circuits for coil 46. The current output of rectifier 16 provides a constant current to load circuits, as in series-lighting circuits. For continuous operation, such as operating a tungsten iodide lamp, load capacitor 24 can be omitted.

Load capacitors can be charged and discharged for production line type of operation, as spot welding or other periodic pulse type of discharge. For pulse discharge operation, it may be required to inactivate alternator 10 for a longer period of time or at a different time than that provided by detector 50. The voltage regulator 80 of FIG. 2 provides control of the charge on load capacitor 24 regardless of the half cycle operation of the control circuit. Thus, when load capacitor 24 is charged to a predetermined level a trickle current through voltage divider 82 has charged capacitor 84 to a proportion of the charge voltage. Capacitor 84 is adjusted to store the energy required to trigger SCR 86 into conduction, when the load is charged to the desired voltage level, and discharges through diode 88 and the cathode gate of SCR 86. Silicon-controlled rectifier 86 activates to place a short circuit across junctions 33 and 34 of diode bridge 30 which short circuits field coil 46 to prevent further load-charging currents. The silicon-controlled rectifier 86 is directly across field coil 46 and therefore takes all the current from the field. Low-valued resistor 89 provides current protection for SCR 86 when capacitor 44 discharges therethrough. Due to the relatively high current-carrying capability of SCR 86, a low resistance value for resistor 89 will avoid an RC time constant problem in discharging capacitor 44. Since SCR 86 has a low forward voltage (approximately 0.7 volt) the field drive circuit can absorb but very little power from the source. Putting a constant current into the load capacitor results in voltage thereacross increasing linearly with time. Power also increases linearly with time and when the required voltage level is obtained, the voltage regulator short circuits the field. The capacitive load is then dumped into the using circuit and the cycle is repeated.

The controlled field alternator charger system is a simple, rugged system and is ideal for use where commercial power is impractical. The upper pulse rate limit of the system is in the order of 1000 Hertz. There are no loading resistors for power dissipation and a high order of efficiency is obtained. Full-wave bridge rectifier 16 may be similar to diode bridge rectifier 30 and alternator 10 can be a standard military three-phase alternator driven by a M 151 jeep engine. Energy can be stored at a 6-kilowatt rate.

I claim:

1. A direct current voltage control system comprising: an alternator for providing an electrical alternating current energy output, rectifier means connected to said alternator for converting said AC energy into direct current energy, a current transformer having a primary winding connected between said alternator and said rectifier means, a diode bridge rectifier having a first pair of opposing junctions connected across the secondary of said current transformer, an alternator field coil connected across a second pair of opposing junctions of said diode bridge, and first and second voltage-level-sensing circuits responsive to alternate half cycles of voltage to limit the alternator output voltage supplied to said rectifier means; said first and second voltage-level-sensing circuits each include a potentiometer connected across said current transformer secondary, a silicon-controlled rectifier connected across said current transformer secondary and said potentiometer, first and second serially connected semiconductor diodes connected between a cathode gate of said rectifier and the variable arm of said potentiometer, the anode of said first diode being connected to said potentiometer arm and the cathode of said second diode being connected to said potentiometer arm and the cathode of said second diode being connected to said rectifier cathode gate, and a capacitor connected between the cathode of said first diode and the anode of said second diode for controlling the trigger voltage of said cathode gate, said second sensing circuit being connected across said transformer secondary in opposition to said first sensing circuit for responding alternately to alternate half cycle inputs.

2. A direct current voltage control system as set forth in claim 1 wherein said rectifier means is a semiconductor diode, full-wave bridge rectifier.

3. A direct current voltage control system comprising: an alternator for providing alternating current power; a first full-wave bridge rectifier connected to said alternator for converting AC energy into DC energy and having first and second out terminals; control means for limiting the voltage supply to said first bridge rectifier, said control means including a current transformer having a primary and a secondary, a second bridge rectifier, and an AC voltage-sensing circuit, said transformer secondary being connected across said voltage-sensing circuit and across a first pair of opposing junctions of said second bridge, said transformer primary being connected in series with said alternator and said first full-wave rectifier; and voltage-regulating means connected to said first bridge rectifier and said second bridge rectifier for controlling the voltage output of said first rectifier.

4. A direct current voltage control system as set forth in claim 3 wherein said voltage-regulating means comprises a silicon-controlled rectifier connected across a second pair of opposing junctions of said second diode bridge, a resistive voltage divider including a potentiometer, a four-layer diode having the anode connected to the variable arm of said potentiometer and the cathode connected to a cathode gate of said rectifier, a capacitor connected between the anode of said four-layered diode and said silicon-controlled rectifier cathode and wherein one side of said voltage divider is connected in common with the cathode of said SCR, and said voltage divider is connected across said first full-wave rectifier output terminals for regulating the output voltage thereacross.

5. A direct current voltage-controlled system as set forth in claim 4 wherein said control means further comprises a field coil and a capacitor connected across said second pair of opposing junctions of said second diode bridge for controlling the alternator magnetic field, and said AC sensing circuit includes a first sensor comprising a silicon-controlled rectifier having a cathode gate, a potentiometer connected across said SCR and across said transformer secondary, a semiconductor diode having the anode connected to the variable arm of said potentiometer, a four-layer diode having the cathode connected to the cathode gate of said SCR, a capacitor having one side connected to said SCR cathode and the other side connected in common with the anode of said four-layer diode and the cathode of said semiconductor diode, and a second amplitude sensor identical to said first sensor and connected in opposition across said transformer secondary.

6. A direct current voltage control system as set forth in claim 5 wherein said first bridge rectifier output terminal has a load capacitance there across for activating said voltage regulator at a selectable charge potential, and said second diode bridge comprises first, second, third, and fourth branches having a diode in each branch said first and third branch having the anodes of said diode connected together and said second and fourth branch having the cathodes of said diodes connected together for providing said second pair of opposing junctions, said first pair of opposing junctions comprising the intersection of said first and second diode branches and the intersection of said third and fourth diode branches.